US011044678B2

(12) United States Patent
Yang

(10) Patent No.: US 11,044,678 B2
(45) Date of Patent: Jun. 22, 2021

(54) ELECTRONIC DEVICE, METHOD FOR TRANSMITTING MESSAGE, AND RELATED PRODUCTS

(71) Applicant: Guangdong Oppo Mobile Telecommunications Corp., Ltd., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/536,851

(22) Filed: Aug. 9, 2019

(65) Prior Publication Data

US 2020/0053662 A1 Feb. 13, 2020

(30) Foreign Application Priority Data

Aug. 10, 2018 (CN) .......................... 201810909842.7

(51) Int. Cl.
*H04B 7/00* (2006.01)
*H04W 52/28* (2009.01)
(Continued)

(52) U.S. Cl.
CPC .......... *H04W 52/283* (2013.01); *H04W 4/12* (2013.01); *H04W 4/80* (2018.02)

(58) Field of Classification Search
CPC ..... H04W 4/80; H04W 52/0235; H04W 4/12; H04W 52/283; H04W 84/12
See application file for complete search history.

(56) References Cited

U.S. PATENT DOCUMENTS 6,741,577 B1* 5/2004 Henon .................. H04W 36/18
370/331
2009/0325510 A1* 12/2009 Pullela ................. H03D 7/1441
455/76

(Continued)

FOREIGN PATENT DOCUMENTS

CN 2842373 Y 11/2006
CN 201947260 U 8/2011
(Continued)

OTHER PUBLICATIONS

Partial European search report issued in corresponding European application No. 19191100.7 dated Oct. 1, 2019.
(Continued)

*Primary Examiner* — Nhan T Le

(57) ABSTRACT

An electronic device, a method for transmitting a message and related products are provided. The method for transmitting a message is applicable to an electronic device and the method includes the following. Predetermined information is obtained, where the predetermined information includes system time, flow of people in a predetermined area, and location information of the predetermined area. A transmission power of a LPWAN wireless-communication module of the electronic device is adjusted according to the predetermined information. A message to be transmitted is determined. The determined message is transmitted according to the adjusted transmission power by the LPWAN wireless-communication module.

20 Claims, 6 Drawing Sheets

(51) Int. Cl.
*H04W 4/80* (2018.01)
*H04W 4/12* (2009.01)

(56) References Cited

U.S. PATENT DOCUMENTS

| | | | |
|---|---|---|---|
| 2013/0178179 A1* | 7/2013 | Han | H04B 1/0014 455/130 |
| 2016/0080896 A1 | 3/2016 | Song et al. | |
| 2017/0372576 A1 | 12/2017 | Choe et al. | |
| 2018/0024224 A1 | 1/2018 | Seller | |
| 2019/0294136 A1* | 9/2019 | Iacobone | H04Q 9/00 |
| 2020/0059686 A1* | 2/2020 | Yang | H04M 1/72533 |

FOREIGN PATENT DOCUMENTS

| | | |
|---|---|---|
| CN | 103826205 A | 5/2014 |
| CN | 204697118 U | 10/2015 |
| CN | 105657656 A | 6/2016 |
| CN | 106507329 A | 3/2017 |
| CN | 106712809 A | 5/2017 |
| CN | 106878468 A | 6/2017 |
| CN | 107222233 A | 9/2017 |
| CN | 107396211 A | 11/2017 |
| CN | 206657863 U | 11/2017 |
| CN | 107864504 A | 3/2018 |
| CN | 108848570 A | 11/2018 |
| CN | 109166578 A | 1/2019 |
| CN | 109922543 A | 6/2019 |
| WO | 2018088953 A1 | 5/2018 |
| WO | 2019105557 A1 | 6/2019 |

OTHER PUBLICATIONS

International search report issued in corresponding international application No. . . ./CN2019/100088 dated Oct. 29, 2019.
Extended European search report issued in corresponding European application No. 19191100.7 dated Dec. 13, 2019.
Second Office Action with English Translation issued in corresponding CN application No. 201810909842.7 dated Sep. 30, 2020.
Third Office Action and English Translation issued in corresponding CN application No. 201810909842.7 dated Mar. 17, 2021.
Examination Report issued in corresponding European application No. 19191100.7 dated Feb. 3, 2021.
First examination report issued in corresponding IN application No. 201914032410 dated Jan. 20, 2021.

\* cited by examiner

ELECTRONIC DEVICE, METHOD FOR TRANSMITTING MESSAGE, AND RELATED PRODUCTS

CROSS-REFERENCE TO RELATED APPLICATION(S)

This application claims priority to Chinese Patent Application No. 201810909842.7, filed on Aug. 10, 2018, the disclosure of which is hereby incorporated by reference in its entirety.

TECHNICAL FIELD

This disclosure relates to the technical field of electronic devices, and more particularly to an electronic device, a method for transmitting a message, and related products.

BACKGROUND

At present, a Bluetooth module of electronic devices on the market can realize point-to-point data sharing in a preset area within a short distance. However, a distance for data transmission is limited, transmission power is low, and a coverage area is also limited.

SUMMARY

In implementations of the disclosure, an electronic device, a method for transmitting a message, and related products are provided.

In a first aspect of the present disclosure, an electronic device is provided. The electronic device includes an antenna, a low-power wide-area network (LPWAN) wireless-communication module coupled with the antenna, and an application processor coupled with the LPWAN wireless-communication module.

The LPWAN wireless-communication module is operable in a bypass mode and an operation mode. The operation mode is configured for implementing an enhanced signal transmission-reception function in a LPWAN and a signal transmitted by the electronic device has an effective transmission distance longer than a preset distance.

In a second aspect of the present disclosure, a method for transmitting a message is provided. The method for transmitting a message is applicable to an electronic device including a LPWAN wireless-communication module. The method includes the following. Predetermined information is obtained, where the predetermined information includes system time, flow of people in a predetermined area, and location information of the predetermined area. A transmission power of a LPWAN wireless-communication module of the electronic device is adjusted according to the predetermined information. A message to be transmitted is determined. The determined message is transmitted according to the adjusted transmission power by the LPWAN wireless-communication module.

In a third aspect of the present disclosure, an apparatus for transmitting a message is provided. The apparatus for transmitting a message is applicable to an electronic device including a LPWAN wireless-communication module. The apparatus includes a processing unit and a communication unit.

The processing unit is configured to: obtain predetermined information, where the predetermined information includes system time, flow of people in a predetermined area, and location information of the predetermined area; adjust a transmission power of a LPWAN wireless-communication module of the electronic device according to the predetermined information; determine a message to be transmitted; control the LPWAN wireless-communication module to transmit the determined message according to the adjusted transmission power.

In a fourth aspect of the present disclosure, an electronic device is provided. The electronic device includes an application processor, a memory, a communication interface, and one or more programs stored in the memory and configured to be executed by the application processor. The one or more programs include instructions for performing the method in the second aspect of the disclosure.

In a fifth aspect of the present disclosure, a non-transitory computer readable storage medium is provided. The computer readable storage medium is configured to store computer programs for electronic data interchange. The computer programs, when executed by a computer, are operable with the computer to execute all or part of the operations described in the second aspect of the disclosure.

In a sixth aspect of the present disclosure, a computer program product is provided. The computer program product includes a non-transitory computer-readable storage medium configured to store computer programs. The computer programs are operable with a computer to perform all or part of the operations of the second aspect of the disclosure. The computer program product can be a software installation package.

BRIEF DESCRIPTION OF THE DRAWINGS

To describe technical solutions in implementations of the present disclosure more clearly, the following will briefly introduce the accompanying drawings required for describing the implementations. Apparently, the accompanying drawings in the following description illustrate only some implementations of the present disclosure. Those of ordinary skill in the art may also obtain other drawings based on these accompanying drawings without creative efforts.

DETAILED DESCRIPTION

Figure 1A:
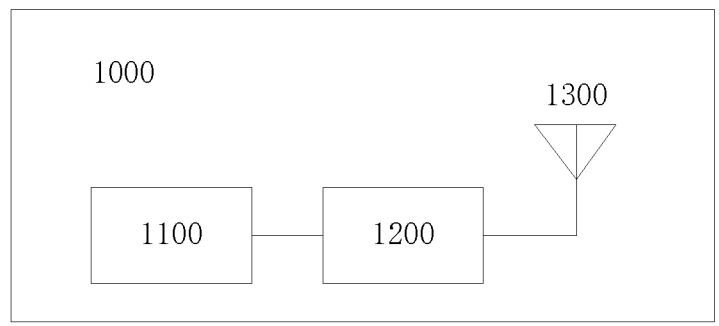
FIG. 1A is a schematic structural diagram illustrating an electronic device according to an implementation of the present disclosure.

In order for those skilled in the art to better understand technical solutions of the present disclosure, technical solutions in implementations of the present disclosure will be described clearly and completely hereinafter with reference to the accompanying drawings. Apparently, the described implementations are merely some implementations, rather than all implementations, of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that implementations described in the present disclosure may be combined with other implementations.

The electronic device involved in implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like.

A LPWAN is a type of wireless telecommunication wide area network designed to allow long-range communications at a low bit rate among things (connected objects). The long range, low power, and low cost rate distinguish this type of network from a wireless WAN that is designed to connect users or businesses, and carry more data, using more power. Ultra Narrowband (UNB) modulation technology used for LPWAN by various companies can include but is not limited to random phase multiple access (RPMA), Qowisio, DART, Sigfox, Telensa, Nwave, Weightless, DART, NB-Fi Protocol. Currently, there are mainly three types of technologies that cater to different needs of LPWAN market, including LoRa (which is a protocol that operates in unlicensed spectrum), NB-IOT technology (which a protocol that operates in licensed spectrum) supported by 3GPP, and Sigfox technology (which is a protocol that operates ultra-narrow-band radios in unlicensed spectrum). Bluetooth is also a type of LPWAN technologies.

Hereinafter, implementations of the disclosure will be described in detail.

FIG. 1A is a schematic structural diagram illustrating an electronic device 1000 according to an implementation of the present disclosure. As illustrated in FIG. 1A, the electronic device 1000 includes an application processor 1100, a LPWAN wireless-communication module 1200, and an antenna 1300. The application processor 1100 is coupled with the LPWAN wireless-communication module 1200. The LPWAN wireless-communication module 1200 is coupled with the antenna 1300.

The LPWAN wireless-communication module 1200 is operable in an operation mode. When the LPWAN wireless-communication module operates in the operation mode, the electronic device is configured to implement an enhanced signal transmission-reception function in a LPWAN and a signal transmitted by the electronic device has an effective transmission distance longer than a preset distance.

The LPWAN wireless-communication module 1200 can also be operable in a bypass mode. When the LPWAN wireless-communication module operates in the bypass mode, the electronic device is configured to implement a short-haul signal transmission-reception function in the LPWAN and a signal transmitted by the electronic device has an effective transmission distance shorter than the preset distance.

The application processor 1100 is a control center of the electronic device, which can connect various parts of the entire electronic device via various interfaces and lines and can execute various functions of the electronic device and processes data by running or executing software programs and/or modules stored in the memory and calling data stored in the memory, thereby monitoring the electronic device as a whole. The application processor 1100 mainly deals with operating systems, user interfaces, applications, and the like.

The preset distance may be 500 m (meter), 1 km (kilometer), etc., which is not limited therein. The preset distance can be specified by setting software parameters and/or hardware parameters of the LPWAN wireless-communication module. The communication protocol supported with aid of the LPWAN wireless-communication module includes but is not limited to any of the following: Bluetooth protocol, wireless fidelity (Wi-Fi) protocol, and ZigBee protocol.

Bluetooth wireless-communication is a kind of the LPWAN wireless-communication module. Taking the Bluetooth wireless-communication module as an example, the Bluetooth wireless-communication module may include a Bluetooth modem, a receiver, and a transmitter. In terms of the hardware implementation of the Bluetooth modem, the receiver, and the transmitter, the following technologies can be adopted.

(1) The transmitter adopts a polar architecture, thereby improving the efficiency of an external power amplifier and lowering the peak-to-average power ratio (PAPR) requirement. (2) Since the data rate of enhanced data transmission is low, the bandwidth of a modulation signal is lower than the bandwidth of the phase-locked loop circuit module, and one point modulation can be directly adopted on the basis of the polar architecture. (3) The receiver adopts the Low-intermediate frequency (Low-IF) architecture to reduce the impact of flicker noise on sensitivity. (5) An analog-to-digital converter (ADC) of the receiver adopts a Quadrature bandpass sigma-delta ADC (SD-ADC). (6) SD-ADC has adjustable center frequency and bandwidth, and the optimal noise transfer function (NTF) is obtained based on bandwidth of a traditional signal and bandwidth of an enhanced signal to suppress quantization noise. (7) A modem has an adjustable clock, and for enhanced signal transmission, low-speed transmission can be achieved by directly dividing the original frequency of the clock by 8 or 16. (8) Since the data rate of the signal is low and there is large in-band bandwidth available, the BT in the pulse shaping filter (PSF) can be increased to suppress the interference due to the inter symbol interference (ISI) codes.

As can be seen, in implementations of the present disclosure, the electronic device can implement an enhanced data transmission with aid of the LPWAN wireless-communication module, thereby increasing an effective distance in which the electronic device performs LPWAN communication, which is beneficial to expanding the use of a LPWAN communication function of the electronic device, thereby satisfying various requirements of specific scenarios such a scenario without mobile network and expanding functionality and applicability of the electronic device.

Figure 1B:
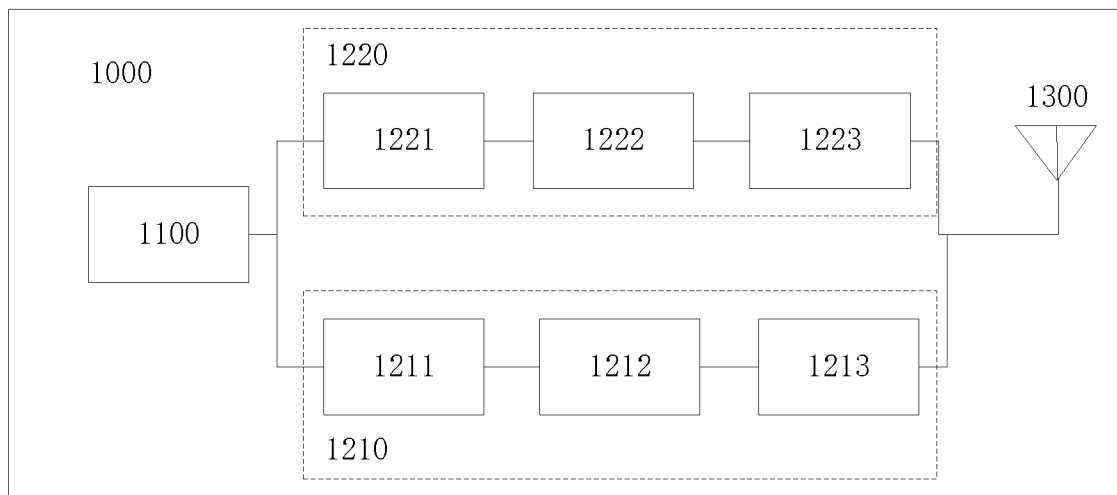
FIG. 1B is a schematic structural diagram illustrating an electronic device according to another implementation of the present disclosure.

In an implementation, as illustrated in FIG. 1B, the LPWAN wireless-communication module 1200 includes a received-signal processing circuit 1210 and a transmitted-signal processing circuit 1220.

The transmitted-signal processing circuit 1220 includes a modulation circuit module 1221, a transmitter 1222, and an external power amplifier 1223. The received-signal processing circuit 1210 includes a demodulation circuit module 1211, a receiver 1212, and an external low-noise filter 1213.

The application processor 1100 is coupled with the modulation circuit module 1221 and a demodulation circuit module 1211. The modulation circuit module 1221 is coupled with the transmitter 1222. The transmitter 1222 is coupled with the external power amplifier 1223. The external power amplifier 1223 is coupled with the antenna 1300. The demodulation circuit module 1211 is coupled with the receiver 1212. The receiver 1212 is coupled with the external low-noise filter 1213. The external low-noise filter 1213 is coupled with the antenna 1300.

The external power amplifier 1223 is operable in the operation mode, that is, the electronic device is configured to transmit a signal via the external power amplifier 1223. The operation mode is configured for implementing an enhanced signal-transmission function in the preset area (in other words, in the LPWAN), and the enhanced signal-transmission function has an effective transmission distance longer than the preset distance.

The external low-noise filter 1213 is operable in the operation mode, that is, the electronic device is configured to receive a signal via the external low-noise filter 1213. The operation mode is configured for implementing an enhanced signal-reception function in the LPWAN, and the enhanced signal-reception function has an effective transmission distance longer than the preset distance.

The modulation circuit module 1221 and the demodulation circuit module 1211 are generally integrated to be a modem as a separate device disposed in the electronic device.

As can be seen, in this implementation, in the electronic device, on the basis of an original LPWAN wireless-communication module, the external power amplifier is directly provided to the transmitted-signal processing circuit, and the external low-noise filter is directly provided to the received-signal processing circuit, thereby increasing transmitting power and improving receiving sensitivity. The communication module is modified slightly, and an original wireless communication protocol is directly multiplexed. In this way, high efficiency in setting is achieved with low function expansion cost, and the manner in which modes are switched is convenient and efficient.

Figure 1C:
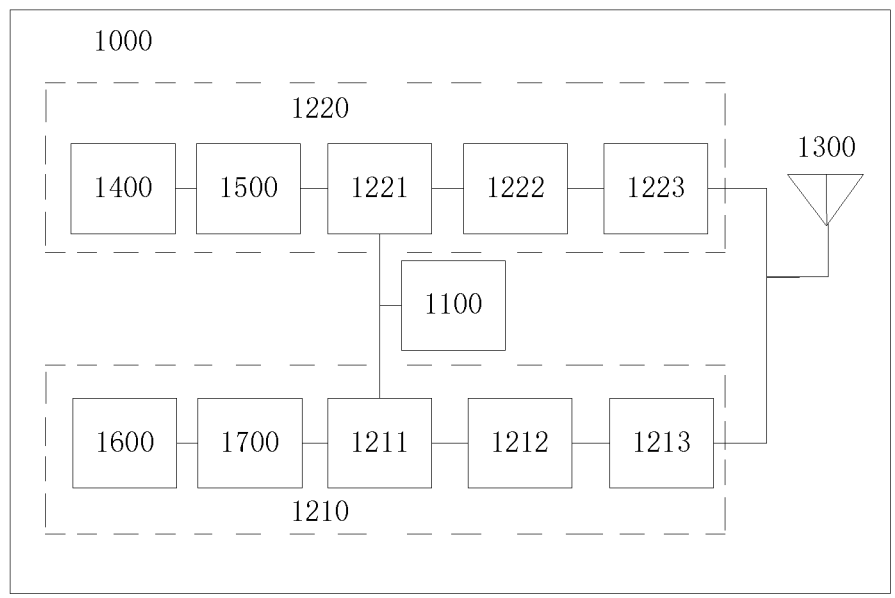
FIG. 1C is a schematic structural diagram illustrating an electronic device according to another implementation of the present disclosure.

In an implementation, as illustrated in FIG. 1C, the electronic device 1000 further includes a microphone 1400 and an audio encoder 1500. The microphone 1400 is coupled with the audio encoder 1500. The audio encoder 1500 is coupled with the modulation circuit module 1221.

The electronic device 1000 further includes an audio decoder 1600 and a speaker 1700. The audio decoder 1600 is coupled with the speaker 1700. The speaker 1700 is coupled with the demodulation circuit module 1211.

As can be seen, in this implementation, since the microphone, the audio encoder, the audio decoder, and the speaker can process voice data, types of data supported by the enhanced data transmission function of the electronic device can be extended to voice data, thereby further improving the applicability of the enhanced data transmission function.

Figure 1D:
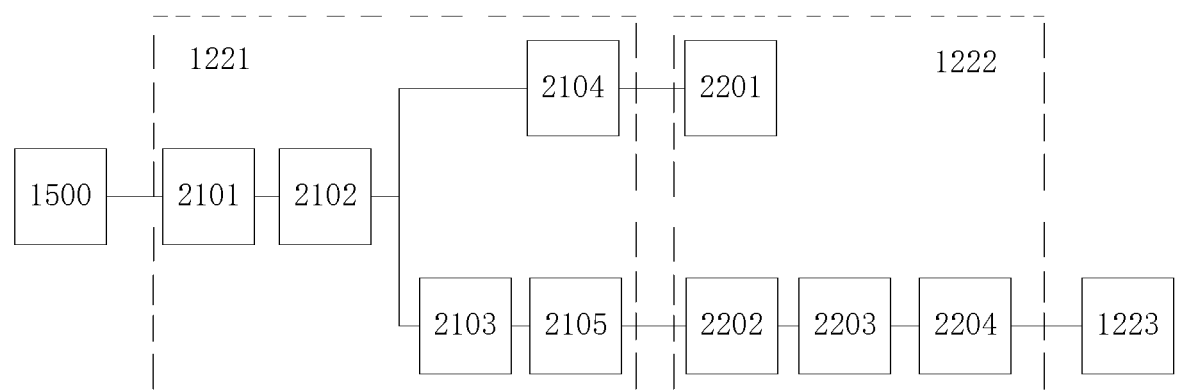
FIG. 1D is a schematic structural diagram illustrating a modulation circuit module and a transmitter according to an implementation of the present disclosure.

In an implementation, as illustrated in FIG. 1D, the modulation circuit module 1221 includes a first digital-signal processing chip 2101, a coordinate rotation digital computer 2102 (such as catesian to polar), a differential circuit module 2103, a first digital-to-analog converter 2104, and a second digital-to-analog converter 2105. The transmitter 1222 includes a first low-pass filter 2201, a second low-pass filter 2202, a phase-locked loop circuit module 2203, and an integrated power amplifier 2204.

The first digital-signal processing chip 2101 is coupled with the coordinate rotation digital computer 2102. The coordinate rotation digital computer 2102 is coupled with the first digital-to-analog converter 2104 and the differential circuit module 2103. The differential circuit module 2103 is coupled with the second digital-to-analog converter 2105. The first digital-to-analog converter 2104 is coupled with the first low-pass filter 2201. The second digital-to-analog converter 2105 is coupled with the second low-pass filter 2202. The second low-pass filter 2202 is coupled with the phase-locked loop circuit module 2203. The phase-locked loop circuit module 2203 is coupled with the integrated power amplifier 2204. The integrated power amplifier 2204 is coupled with the external power amplifier 1223.

As can be seen, in this implementation, the polar architecture is adopted for the transmitter to improve the efficiency of the external power amplifier and lower the PAPR requirement. The clock of a modem is adjustable, and the enhanced signal transmission-reception function can implement a low-speed transmission by directly dividing the original frequency of the lock by 8 or 16.

Figure 1E:
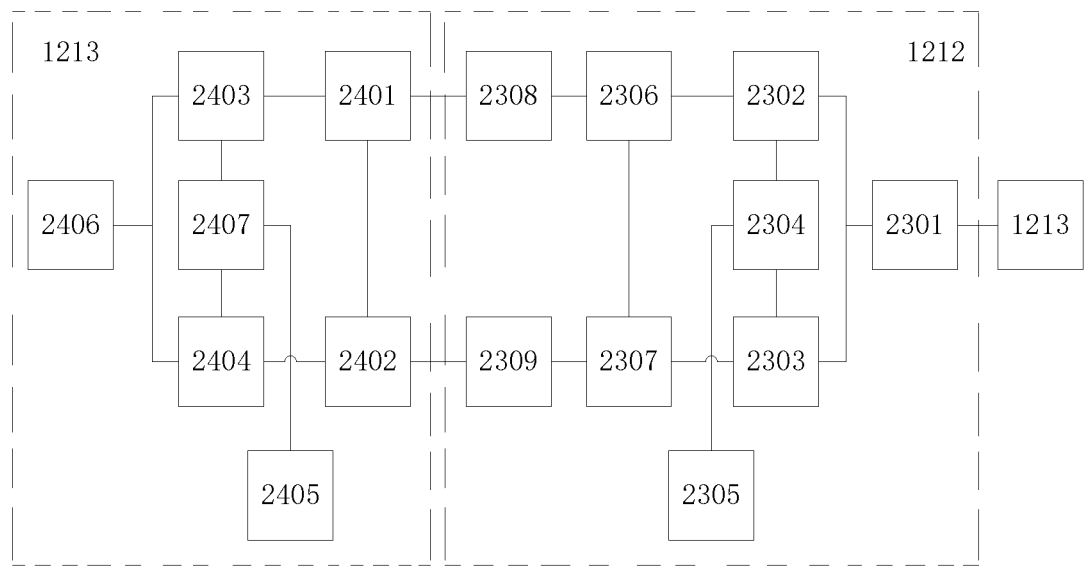
FIG. 1E is a schematic structural diagram illustrating a receiver and a demodulation circuit module according to an implementation of the present disclosure.

In an implementation, as illustrated in FIG. 1E, the receiver 1212 includes an integrated low-noise filter 2301, a first mixer 2302, a second mixer 2303, a first in-phase and quadrature (IQ) phase modulation module 2304, a first local oscillator 2305, a first image-reject filter 2306, a second image-reject filter 2307, a first variable gain amplifier 2308, and a second variable gain amplifier 2309.

The demodulation circuit module 1211 includes a first analog-to-digital converter 2401, a second analog-to-digital converter 2402, a third mixer 2403, a fourth mixer 2404, a second IQ phase modulation module 2405, a second digital-signal processing chip 2406, and a second local oscillator 2407.

The external low-noise filter 1213 is coupled with the integrated low-noise filter 2301. The integrated low-noise filter 2301 is coupled with the first mixer 2302 and the second mixer 2303. The first mixer 2302 and the second mixer 2303 are coupled with the first IQ phase modulation module 2304. The first IQ phase modulation module 2304 is coupled with the first local oscillator 2305. The first mixer 2302 is coupled with the first image-reject filter 2306. The first image-reject filter 2306 is coupled with the first variable gain amplifier 2308. The first variable gain amplifier 2308 is coupled with the first analog-to-digital converter 2401. The first analog-to-digital converter 2401 is coupled with the third mixer 2403. The third mixer 2403 is coupled with the second digital-signal processing chip 2406. The second image-reject filter 2307 is coupled with the second variable gain amplifier 2309. The second variable gain amplifier 2309 is coupled with the second analog-to-digital converter 2402. The second analog-to-digital converter 2402 is coupled with the fourth mixer 2404. The fourth mixer 2404 is coupled with the second digital-signal processing chip 2406. The third mixer 2403 and the fourth mixer 2404 are coupled with the second IQ phase modulation module 2405. The second IQ phase modulation module 2405 is coupled with the second local oscillator 2407.

The first image-reject filter 2306 is coupled with the second image-reject filter 2307, and the first analog-to-digital converter 2401 is coupled with the second analog-to-digital converter 2402.

As can be seen, in this implementation, analog-to-digital converters of the receiver adopt Quadrature bandpass SD-ADC. Since the center frequency and the bandwidth of the SD-ADC are adjustable, the optimal NTF is obtained based on bandwidth of the traditional signal and the enhanced signal to suppress quantization noise. The clock of a modem is adjustable, and the enhanced signal transmission-reception function can implement a low-speed transmission by directly dividing the original frequency of the lock by 8 or 16.

Figure 1F:
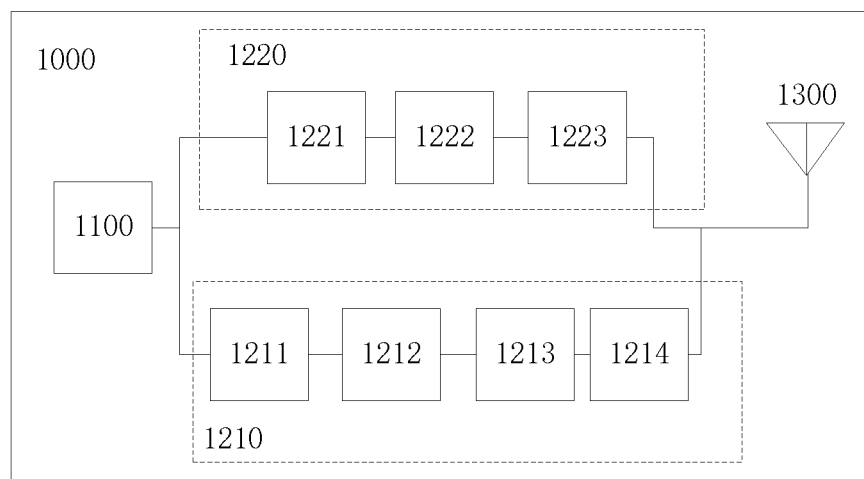
FIG. 1F is a schematic structural diagram illustrating an electronic device according to another implementation of the present disclosure.

In an implementation, as illustrated in FIG. 1F, the received-signal processing circuit 1210 further includes a pre-filter 1214, and the pre-filter 1214 is coupled with the antenna 1300 and the external low-noise filter 1213.

As can be seen, in this implementation, the pre-filter 1214 is provided to further filter out clutter, thereby improving reception stability.

Figure 2A:
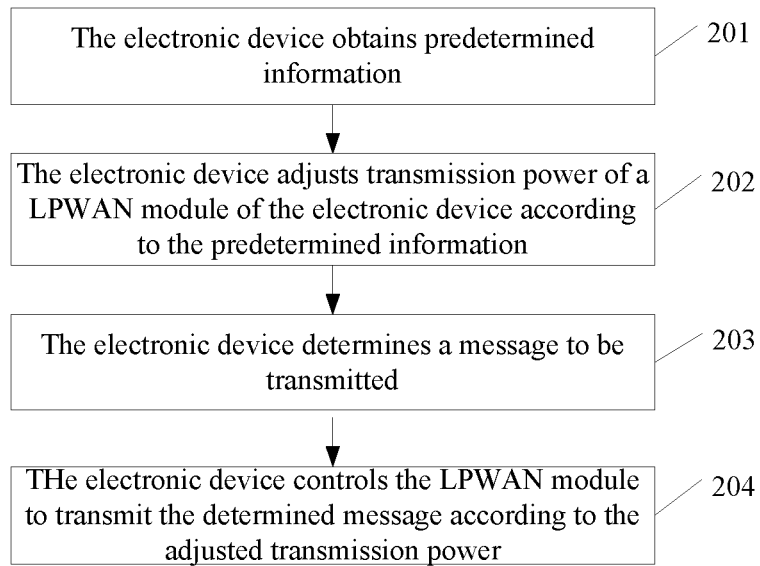
FIG. 2A is a schematic flowchart illustrating a method for transmitting a message according to an implementation of the present disclosure.

FIG. 2A is a schematic flowchart illustrating a method for transmitting a message according to an implementation of the present disclosure. The method for transmitting a message is applicable to the electronic device illustrated in FIG. 1A to FIG. 1F. The electronic device includes a LPWAN wireless-communication module. As illustrated in FIG. 2A, the method for transmitting a message begins with operations at S201.

At S201, the electronic device obtains predetermined information, where the predetermined information includes system time, flow of people in a predetermined area, and location information of the predetermined area.

At S202, the electronic device adjusts a transmission power of a low-power wide-area Network (LPWAN) module of the electronic device according to the predetermined information.

At S203, the electronic device determines a message to be transmitted.

At S204, the electronic device controls the LPWAN wireless-communication module to transmit the determined message according to the adjusted transmission power.

Reference of The LPWAN wireless-communication module can be made to the LPWAN wireless-communication module 1200 illustrated in FIG. 1A to FIG. 1F. When the LPWAN wireless-communication module operates in an operation mode, the electronic device is configured to implement an enhanced signal transmission-reception function or an enhanced LPWAN communication function in a LPWAN and a signal transmitted by the electronic device has an effective transmission distance longer than a preset distance.

In implementations of the present disclosure, the electronic device obtains the predetermined information, where the predetermined information includes the system time, the flow of people in the predetermined area, and the location information of the predetermined area. Next, the electronic device adjusts the transmission power of the LPWAN wireless-communication module of the electronic device according to the predetermined information. Then the electronic device determines the message to be transmitted. At last, the electronic device controls the LPWAN wireless-communication module to transmit the determined message according to the adjusted transmission power. As can be seen, the electronic device can analyze the predetermined information to determine a proper LPWAN transmission power, and further analyze the predetermined information to realize an accurate match of the message to be transmitted, thereby realizing a combination of power moderateness and information accuracy, thereby avoiding being unable to cover UEs comprehensively according to a single transmission power, or high power consumption caused by the coverage area which is greater than required. In this way, message transmission of the electronic devices can be more flexible and comprehensive.

For example, before obtaining the predetermined information, the electronic device performs LPWAN establishment and network accessing operation.

The LPWAN establishment and network accessing operation includes the following. Both the electronic device and a UE have an enhanced LPWAN communication function. For any one of the electronic device and the UE, it sets itself as an anchor master (AM), creates a network, and sets a network identity (ID) of the network according to its own media access control (MAC) address. For any one of the electronic device and the UE, it sets a times synchronization function (TSF) to N times 512 time units (TU) (N is a positive integer). Generally, a discovery window (DW) is set every 512 TUs.

For a device with the enhanced LPWAN communication function, once the device receives a Beacon frame (that is, a sync beacon, which is called "Beacon frame" hereinafter collectively) sent by one or more devices with the enhanced LPWAN communication function from another network, the device can determine whether to join the other party's network.

A specific process includes the following. The device with the enhanced LPWAN communication function can send AM information of the network to which it belongs to other devices with the enhanced LPWAN communication function by sending a Beacon frame. Similarly, the device with the enhanced LPWAN communication function can also receive a Beacon frame sent by other devices with the enhanced LPWAN communication function from the network or other networks. After receiving the Beacon frame, the device with the enhanced LPWAN communication function can determine whether the Beacon frame is from a device with the enhanced LPWAN communication function from the network to which it belongs or a device with the enhanced LPWAN communication function from other networks. If the Beacon frame is from a device with the enhanced LPWAN communication function from other networks, the device with the enhanced LPWAN communication function can determine whether a network level value corresponding to the received Beacon frame is greater than its own network level value. If YES, the device with the enhanced Bluetooth communication function accesses the network corresponding to the received Beacon frame; otherwise, the device with the enhanced LPWAN communication function remains as it is. In this way, a gather of devices with the enhanced LPWAN communication function is completed, and the device with the enhanced LPWAN communication function will access a network with a higher network level value.

Upon determining to access the network of the other party, the device with the enhanced LPWAN communication function synchronizes its AM with an AM of the accessed network after accessing the network of the other party. As an example, the device with the enhanced LPWAN communication function synchronizes various parameter information of its AM with the AM of the accessed network. For example, its original TSF is updated to a TSF of the AM of the accessed network, and the like.

After synchronization, when a DW of the accessed network arrives, the device with the enhanced LPWAN communication function sends service discovery frames (SDF) message in the DW for service discovery. The SDF message can carry, for example, service subscription information for querying a required service, or service publish information for publishing a service that the device with the enhanced LPWAN communication function can provide. After other devices with the enhanced LPWAN communication function receive the SDF message sent by the device with the enhanced LPWAN communication function, if the other devices determine that the SDF message is satisfied, that is, service matching can be performed, the other devices can respond to the SDF message in the DW to the device with the enhanced LPWAN communication function.

Similarly, in the DW, the device with the enhanced LPWAN communication function can also receive an SDF message for service discovery sent by other devices with the enhanced LPWAN communication function. If the device determines that the received SDF message is satisfied, the device can respond to the SDF message in the DW to a corresponding device with the enhanced LPWAN communication function.

Figure 2B:
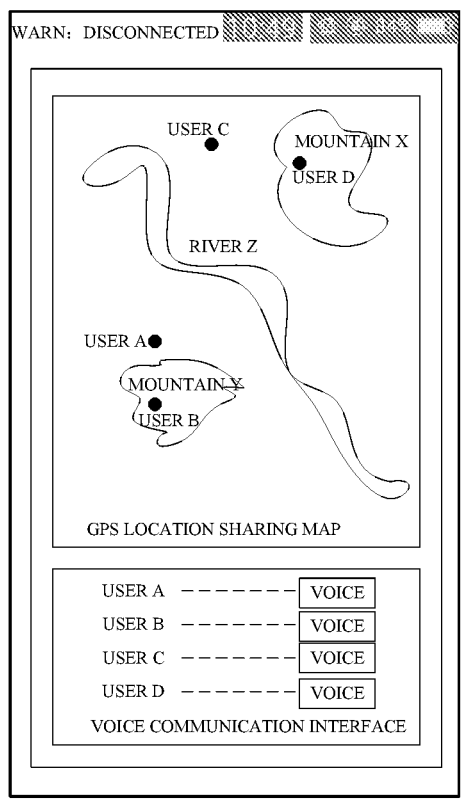
FIG. 2B is a schematic diagram illustrating a predetermined interface according to an implementation of the present disclosure.

For example, FIG. 2B illustrates a possible predetermined interface of a UE. As illustrated in FIG. 2B, suppose that the LPWAN where the LPWAN wireless-communication module is located has user A, user B, user C, and user D, and user A, user B, user C, and user D share location information with each other. The electronic device can receive location information shared by other devices within the LPWAN, display an offline map in an area for location display of the predetermined interface, display corresponding location information on the offline map, and display voice data of all users in an area for contact display, so as to achieve a LPWAN voice communication function in a LPWAN.

Figure 2C:
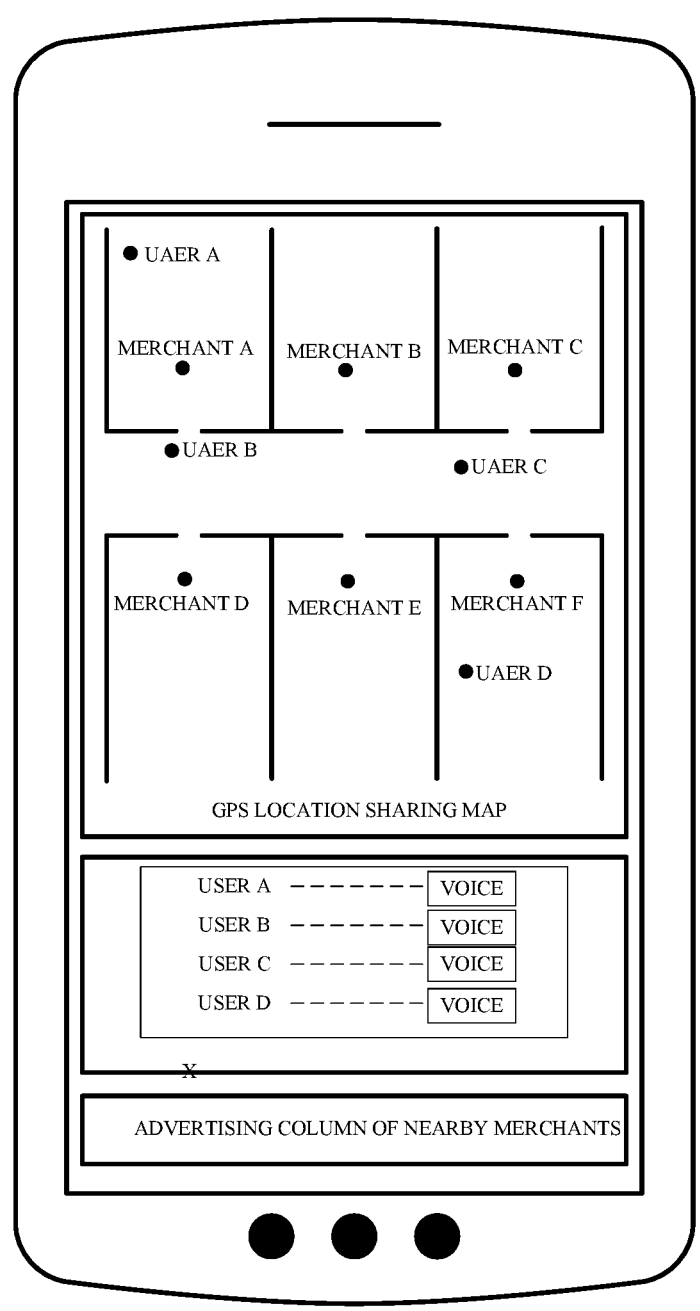
FIG. 2C is a schematic diagram illustrating a predetermined interface according to another implementation of the present disclosure.

FIG. 2C illustrates a possible predetermined interface of the electronic device according to another implementation of the present disclosure. After a gather of devices with the enhanced LPWAN communication function is completed, the electronic device can display a predetermined interface. As illustrated in FIG. 2C, suppose that the LPWAN where the LPWAN wireless-communication module (that is, the LPWAN wireless-communication module) is located has user A, user B, user C, and user D, and these users are indoors, such as in a shopping mall, suppose that the LPWAN where the LPWAN wireless-communication module (that is, the LPWAN wireless-communication module) is located also has merchant A, merchant B, merchant C, merchant D, merchant E, and merchant F, these users can be positioned according to location information such as reference coordinates provided by merchants in the shopping mall free of charge, and the accuracy of positioning can reach 5 meters. At the same time, nearby merchants can also advertise to electronic devices in the LPWAN.

As can be seen, in implementations of the present disclosure, the electronic device can establish, through a LPWAN device, a LPWAN in which communication can be performed in real time. When a UE is beyond a LPWAN or the signal strength of the LPWAN where the UE is located is weak, the UE can connect to a next LPWAN to ensure that the UE can access a LPWAN without disconnection in a wide range. At the same time, during transmission of target data in the LPWAN, the electronic device can synchronously present the target data through the predetermined interface, so that the user can query as required on an interactive interface, thereby making data usage more convenient.

Both the electronic device and the UE are devices with the enhanced LPWAN communication function.

The UE may be, for example, a mobile phone, a tablet computer, a notebook computer, a palmtop computer, a mobile internet device (MID), a wearable device (such as a smart watch, a smart bracelet, a pedometer, etc.), or other terminal devices in which an instant messaging application client can be installed.

In an implementation, the predetermined information is the system time, and the transmission power of the LPWAN wireless-communication module of the electronic device is adjusted according to the predetermined information as follows. A target time period to which the system time belongs is obtained. A predetermined mapping relationship between time periods and transmission powers is obtained. Power corresponding to the target time period is determined by querying the mapping relationship. The transmission power of the LPWAN wireless-communication module of the electronic device is adjusted to the power determined.

The electronic device acquires the system time, and performs time period matching on the system time according to an existing matching relationship between system time and the time periods. In addition, different time periods correspond to different transmission powers.

For example, in a large shopping mall, at 7:00-9:00, 11:00-14:00, and 17:00-20:00, the power of a LPWAN wireless-communication module of an instant messaging terminal in a dining area corresponds to a maximum power value, because the above three time periods are rush hour of meals. At 9:00-11:00, 14:00-17:00, and 20:00-21:00, the power is reduced properly or the LPWAN wireless-communication module can be even disabled. Conversely, at 7:00-9:00, 11:00-14:00, and 17:00-20:00, the power of the LPWAN wireless-communication module of the instant messaging terminal in a shopping area is adjusted to a small value, whereas at 9:00-11:00, 14:00-17:00, and 20:00-21:00, the power is adjusted to a maximum value. After 20:00, considering that many people may come out to relax in the evening, the power of the LPWAN wireless-communication module of the instant messaging terminal in a film area or an entertainment area is adjusted to a great power value.

As can be seen, in this implementation, the electronic device can predict with a high probability flow of people according to time periods, thereby avoiding waste of resources caused by indiscriminate power adjustment.

In an implementation, the predetermined information is the flow of people in the predetermined area, and the transmission power of the LPWAN wireless-communication module of the electronic device is adjusted according to the predetermined information as follows. When the flow of people in the predetermined area is less than predetermined flow of people, a reference coverage area is determined according to the flow of people in the predetermined area, then a transmission power is determined according to the reference coverage area, and afterwards, the transmission power of the LPWAN wireless-communication module of the electronic device is adjusted to the transmission power determined. When the flow of people in the predetermined area is larger than the predetermined flow of people, whether a merchant in the predetermined area has a sales promotion is detected. If YES, a reference coverage area is determined according to the flow of people in the predetermined area and a target coverage area is obtained by correcting the reference coverage area according to the location of the merchant which has the sales promotion, then a transmission power is determined according to the target coverage area, and thereafter the transmission power of the LPWAN wireless-communication module of the electronic device is adjusted to the transmission power determined. If NOT, a reference coverage area is determined according to the flow of people in the predetermined area, a transmission power is determined according to the reference coverage area, and the transmission power of the LPWAN wireless-communication module of the electronic device is adjusted to the transmission power determined.

The electronic device reads the flow of people through a monitoring device in the environment, and calculates a corresponding power according to the flow of people, where the power can be calculated in various manners. For example, a calculation formula may be as follows. Set the maximum flow of people that may be reached in the environment to be Y, set the flow of people read by the monitoring device to be X, and set the maximum power value that the electronic device is able to reach to be K, such that a current transmit power value is expressed as $H=X/Y*K$.

As such, the power of the LPWAN wireless-communication module of the electronic device in different places can be determined accurately by accurate calculation of the flow of people and correction of an area in which the flow of people is concentrated, which can avoid waste of energy while ensuring user experience.

In an implementation, the predetermined information is the flow of people in the predetermined area and the location information of the predetermined area, and the transmission power of the LPWAN wireless-communication module of the electronic device is adjusted according to the predetermined information as follows. A subarea set of the predetermined area is obtained, where the subarea set includes multiple subareas in the predetermined area, and any two subareas are different from each other. Next, flow of people of each of the multiple subareas is obtained. Afterwards, at least one subarea in which flow of people is greater than a first threshold is filtered. Then, a target subarea farthest from the electronic device is selected from the at least one subarea. Thereafter, transmission power is determined according to the target subarea. Finally, the transmission power of the LPWAN wireless-communication module of the electronic device is adjusted to the transmission power determined.

The electronic device obtains a division of a coverage area of the LPWAN wireless-communication module and obtains multiple subareas. The coverage area can be divided flexibly according to a terrain where the electronic device is located and the coverage area of the LPWAN wireless-communication module. A subarea farthest from the electronic device is selected by comparing each of the subareas. A distance between the subarea and the electronic device can be obtained by querying a mapping relationship in a system or stored in the electronic device. A corresponding transmission power in a mapping relationship is queried via the distance, and accordingly the power of the LPWAN wireless-communication module of the electronic device is adjusted to the transmission power queried.

It can be seen that the power of the LPWAN wireless-communication module of the electronic device is adjusted according to different subareas, so that the electronic device can be connected with the UE more efficiently and accurately.

In an implementation, the electronic device determines the message to be transmitted as follows.

The electronic device is connected with the UE via the LPWAN, and sends an SDF message carrying obtained user information through a DW, and the UE responds to the SDF message with user information satisfying a condition to the electronic device through the DW, so that the electronic device can obtain the user information. At the same time, user location information can be obtained through a principle of ranging between devices with the enhanced LPWAN communication function.

The manner in which the electronic device determines the message to be transmitted can be various.

For example, the electronic device determines the message to be transmitted as follows. The electronic device obtains location information of multiple UEs within a signal coverage area corresponding to a current transmission power of the electronic device. In other words, the multiple UEs within the signal coverage area corresponding to the current transmission power of the electronic device are in the network where the electronic device is currently located. Then, the electronic device obtains at least one equipment set by dividing the multiple UEs according to the location information of multiple UEs and location areas of at least one merchant within the signal coverage area corresponding to the current transmission power, where locations (location information) of UEs in each of the at least one equipment set are in a location area of a merchant corresponding to the each equipment set. The electronic device obtains a message corresponding to each merchant by querying a mapping relationship in a system or a mapping relationship stored in the electronic device, and then determines the message required to be transmitted to each equipment set in each location area of each merchant.

In another implementation, the electronic device determines the message to be transmitted as follows. The electronic device obtains user information of each of multiple UEs within a signal coverage area corresponding to a current transmission power. The electronic device obtains multiple user information sets by categorizing the user information of each of the multiple UEs according to a predetermined parameter, where the predetermined parameter includes any one of the following: gender, age, occupation, and interest. Then the electronic device determines the message to be transmitted for the multiple user information sets, in other words, the electronic device determines the message to be transmitted for user devices corresponding to each of the multiple user information sets.

The electronic device categorizes the user information by reading a predetermined parameter stored in a system or stored in the electronic device. The age is divided by age groups. For example, a male at the age of 20 to 30 who enjoys basketball and works in an Internet industry can be categorized into a group of people. In shopping malls, practically, the message to be transmitted for such a group of people can mainly focus on sportswear for young people, basketball clothing and equipment, and electronic products. For another example, for a female at the age of 30 to 40 who enjoys painting and works as a professional designer, the message to be transmitted can mainly focus on niche clothing with a chic style.

It can be seen that user's preferences can be predicted by categorizing the user information. In this way, a more accurate push (transmission) can be realized, which will be easier to provide useful information to the UE, thereby improving user experience and improving shopping efficiency in the shopping mall.

For another example, the electronic device determines the message to be transmitted as follows. The electronic device obtains a target time period to which the system time belongs and obtains a predetermined mapping relationship between time periods and massages. Then the electronic device obtains a message corresponding to the target time period by querying the mapping relationship. Finally, the electronic device determines the message obtained as the message to be transmitted. In other words, the electronic device obtains a time period that matches the system time by querying a mapping relationship, and then queries, by the system, a message applicable to the corresponding time period. For example, in a shopping mall, time periods corresponding to the morning, noon, and the evening match diet-related information, time periods corresponding to the forenoon mainly match shopping-related information, and the proportion of news content such as movie-related information and entertainment-related information can be increased in the afternoon and in the evening.

It can be seen that, in this implementation, the information can be delivered more accurately and efficiently by predicting a user behavior during a time period.

Figure 3:
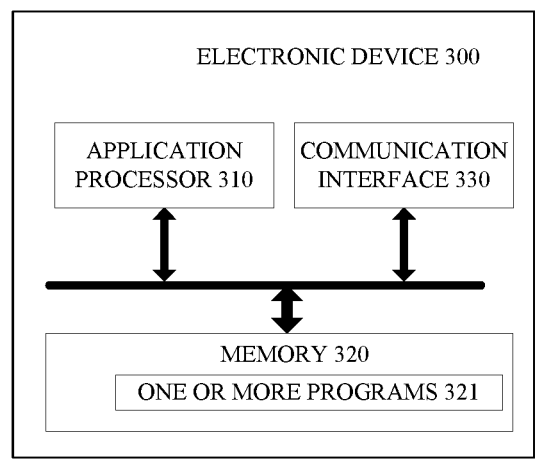
FIG. 3 is a schematic structural diagram illustrating an electronic device according to an implementation of the present disclosure.

Corresponding to the implementations illustrated in FIG. 2A, FIG. 3 is a schematic structural diagram illustrating an electronic device 300 according to an implementation of the present disclosure. As illustrated in FIG. 3, the electronic device 300 includes a processor 310, a memory 320, a communication interface 330, and one or more programs 321. The one or more programs 321 are stored in the memory 320 and are configured to be executed by the processor 310. The one or more programs 321 include instructions operable with the processor to: obtain predetermined information, where the predetermined information includes system time, flow of people in a predetermined area, and location information of the predetermined area; adjust a transmission power of a LPWAN wireless-communication module of the electronic device according to the predetermined information; determine a message to be transmitted; transmit the determined message according to the adjusted transmission power by the LPWAN wireless-communication module.

The communication interface 330 can be a LPWAN wireless-communication module.

As can be seen, in implementations of the present disclosure, the electronic device obtains the predetermined information, where the predetermined information includes the system time, the flow of people in the predetermined area, and the location information of the predetermined area. Then the electronic device adjusts the transmission power of the LPWAN wireless-communication module of the electronic device according to the predetermined information. Thereafter, the electronic device determines the message to be transmitted. Finally, the electronic device controls the LPWAN wireless-communication module to transmit the determined message according to the adjusted transmission power. As can be seen, the electronic device can flexibly adjust the transmission power according to the predetermined information and push the message according to the adjusted transmission power, so as to avoid being unable to cover UEs comprehensively with only a single transmission power, or high power consumption caused by the coverage area broader than required, which can improve flexibility and comprehensiveness of message transmission of the electronic devices.

In an implementation, the predetermined information is the system time, and in terms of adjusting the transmission power of the LPWAN wireless-communication module of the electronic device according to the predetermined information, the one or more programs 321 include instructions operable with the processor to: obtain a target time period to which the system time belongs; obtain a predetermined mapping relationship between time periods and transmission powers; determine power corresponding to the target time period by querying the mapping relationship; adjust the transmission power of the LPWAN wireless-communication module of the electronic device to the power determined.

In an implementation, the predetermined information is the flow of people in the predetermined area; in terms of adjusting the transmission power of the LPWAN wireless-communication module of the electronic device according to the predetermined information, the one or more programs 321 further include instructions operable with the processor to: determine a reference coverage area according to the flow of people in the predetermined area when the flow of people in the predetermined area is less than predetermined flow of people, determine a transmission power according to the reference coverage area, and adjust the transmission power of the LPWAN wireless-communication module of the electronic device to the transmission power determined; detect whether a merchant in the predetermined area has a sales promotion when the flow of people in the predetermined area is larger than the predetermined flow of people; if YES, determine a reference coverage area according to the flow of people in the predetermined area and obtain a target coverage area by correcting the reference coverage area according to the location of the merchant which has the sales promotion; determine a transmission power according to the target coverage area, and adjust the transmission power of the LPWAN wireless-communication module of the electronic device to the transmission power determined; if NOT, determine a reference coverage area according to the flow of people in the predetermined area, determine a transmission power according to the reference coverage area, and adjust the transmission power of the LPWAN wireless-communication module of the electronic device to the transmission power determined.

In an implementation, the predetermined information is the flow of people in the predetermined area and the location information of the predetermined area; in terms of adjusting the transmission power of the LPWAN wireless-communication module of the electronic device according to the predetermined information, the one or more programs 321 further include instructions operable with the processor to: obtain a subarea set of the predetermined area, where the subarea set includes a plurality of subareas in the predetermined area, and any two subareas being different from each other; obtain flow of people of each of the plurality of subareas; filter at least one subarea in which flow of people is greater than a first threshold; select from the at least one subarea a target subarea farthest from the electronic device; determine a transmission power according to the target subarea; adjust the transmission power of the LPWAN wireless-communication module of the electronic device to the transmission power determined.

In an implementation, in terms of determining the message to be transmitted, the one or more programs 321 further include instructions operable with the processor to: obtain location information of a plurality of UEs within a signal coverage area corresponding to a current transmission power; divide the plurality of UEs into at least one equipment set according to the location information and a location area of at least one merchant within the signal coverage area, where location information of UEs in each of the at least one equipment set is in a location area of a merchant corresponding to the each device set; determine a message to be transmitted to the UEs in the each of the at least one equipment set.

In an implementation, in terms of determining the message to be transmitted, the one or more programs 321 further include instructions operable with the processor to: obtain user information of each of a plurality of UEs within a signal coverage area corresponding to a current transmission power; obtain a plurality of user information sets by categorizing the user information of each of the plurality of UEs according to a predetermined parameter, where the predetermined parameter includes any one of the following: gender, age, occupation, and interest; determine the message to be transmitted for the plurality of user information sets.

In an implementation, in terms of determining the message to be transmitted, the one or more programs 321 further include instructions operable with the processor to: obtain a target time period to which the system time belongs; obtain a predetermined mapping relationship between time periods and massages; obtain a message corresponding to the target time period by querying the mapping relationship; determine the message obtained as the message to be transmitted.

The foregoing solution of the implementations of the disclosure is mainly described from the perspective of execution of the method. It can be understood that, in order to implement the above functions, the electronic device includes hardware structures and/or software modules for performing respective functions. Those skilled in the art should readily recognize that units and algorithmic operations of various examples described in connection with implementations herein can be implemented in hardware or a combination of the hardware and computer software. Whether a function is implemented by means of the hardware or hardware driven by the computer software depends on the particular application and design constraints of the technical solution. Those skilled in the art may use different methods to implement the described functions for each particular application, but such implementation should not be considered as beyond the scope of the present disclosure.

In implementations of the disclosure, the electronic device can be divided into different functional units in accordance with the foregoing method examples. For example, each functional unit may be divided into different functional units corresponding to each function, and two or more functions may be integrated in one processing unit. The above-mentioned integrated unit can be implemented in the form of hardware or a software functional unit. It should be noted that the division of units provided herein is illustrative and is merely a logical function division, and there may be other division manners in actual implementation.

Figure 4:
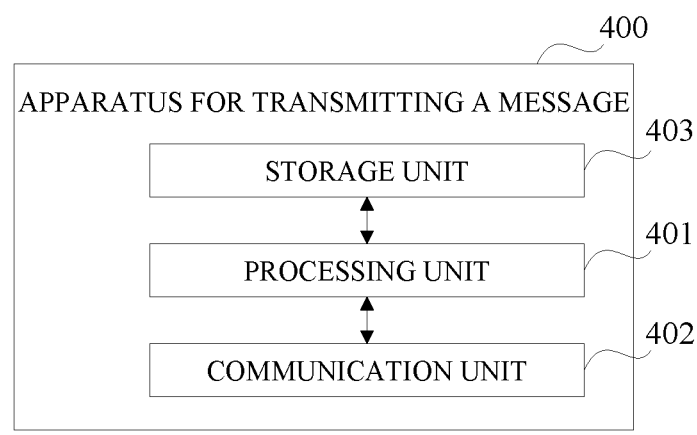
FIG. 4 is a block diagram illustrating an apparatus for transmitting a message according to an implementation of the present disclosure.

FIG. 4 is a schematic structural diagram illustrating an apparatus 400 for transmitting a message according to an implementation of the present disclosure. The apparatus 400 for transmitting a message is applicable to the electronic device illustrated in FIG. 1A to FIG. 1F. The electronic device includes a LPWAN wireless-communication module.

The apparatus 400 for transmitting a message includes a processing unit 401 and a communication unit 402.

The processing unit 401 is configured to obtain predetermined information, where the predetermined information includes system time, flow of people in a predetermined area, and location information of the predetermined area; adjust a transmission power of a LPWAN wireless-communication module of the electronic device according to the predetermined information; determine a message to be transmitted; control the LPWAN wireless-communication module to transmit the determined message according to the adjusted transmission power.

The apparatus 400 for transmitting a message may further include a storage unit 403. The storage unit 403 is configured to store program codes and data of the electronic device. The processing unit 401 may be an application processor, and the communication unit 402 may be a global communication bus, a transceiver, etc., and the storage unit 403 may be a memory.

As can be seen, in implementations of the present disclosure, the electronic device obtains the predetermined information, where the predetermined information includes the system time, the flow of people in the predetermined area, and the location information of the predetermined area. Then the electronic device adjusts the transmission power of the LPWAN wireless-communication module of the electronic device according to the predetermined information. Thereafter, the electronic device determines the message to be transmitted. Finally, the electronic device controls the LPWAN wireless-communication module to transmit the determined message according to the adjusted transmission power. As can be seen, the electronic device can flexibly adjust the transmission power according to the predetermined information and push the message according to the adjusted transmission power, so as to avoid being unable to cover UEs comprehensively with only a single transmission power, or high power consumption caused by the coverage area broader than required, which can improve flexibility and comprehensiveness of message transmission of the electronic devices.

In an implementation, in terms of determining the message to be transmitted, the processing unit 401 is configured to obtain user information of each of multiple UEs within a signal coverage area corresponding to a current transmission power; obtain multiple user information sets by categorizing the user information of each of the multiple UEs according to a predetermined parameter, where the predetermined parameter includes any one of the following: gender, age, occupation, and interest; determine the message to be transmitted for the multiple user information sets. The user information is obtained from the UE via the communication unit 402.

Implementations of the present disclosure also provide a computer readable storage medium. The computer readable storage medium is configured to store computer programs for electronic data interchange which, when executed by a computer, are operable with the computer to execute all or part of the operations of any of the methods described in the above-described method implementations. The computer may include the electronic device.

Implementations of the present disclosure also provide a computer program product. The computer program product includes a non-transitory computer readable storage medium configured to store computer programs. The computer programs are operable with a computer to perform all or part of the operations of any of the methods described in the above method implementations. The computer program product may be a software installation package. The computer may include an electronic device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

The implementations of the present disclosure are described in detail above, and the principles and implementations of the present disclosure are described herein by using specific implementations. The description of the above implementations is only for helping to understand the method and the technical solutions of the present disclosure. For those of ordinary skill in the art, there will be changes in specific implementations and applications according to the idea of the present disclosure. In conclusion, the content of the specification should not be understood as limiting the disclosure.

What is claimed is:

1. An electronic device, comprising:
an antenna;
a low-power wide-area network (LPWAN) wireless-communication module, coupled with the antenna; and
an application processor, coupled with the LPWAN wireless-communication module,
  the LPWAN wireless-communication module being operable in an operation mode;
  the electronic device being configured to implement an enhanced signal transmission-reception function in a LPWAN and a signal transmitted by the electronic device having an effective transmission distance longer than a preset distance, when the LPWAN wireless-communication module operates in the operation mode;
  wherein the LPWAN wireless-communication module comprises a received-signal processing circuit and a transmitted-signal processing circuit, and the received-signal processing circuit and the transmitted-signal processing circuit are connected in parallel;
  wherein the received-signal processing circuit comprises a demodulation circuit module, a receiver, and an external low-noise filter, and wherein the demodulation circuit module is coupled with the receiver, the receiver is coupled with the external low-noise filter, and the external low-noise filter is coupled with the antenna; and the external low-noise filter is operable in the operation mode, the operation mode is configured for implementing an enhanced signal-reception function in the LPWAN, and the enhanced signal-reception function has an effective transmission distance longer than the preset distance; and
  wherein the transmitted-signal processing circuit comprises a modulation circuit module, a transmitter, and an external power amplifier, and wherein the application processor is coupled with the modulation circuit module and the demodulation circuit module, the modulation circuit module is coupled with the transmitter, the transmitter is coupled with the external power amplifier, and the external power amplifier is coupled with the antenna; and the external power amplifier is operable in the operation mode, the operation mode is configured for implementing an enhanced signal-transmission function in the LPWAN, and the enhanced signal-transmission function has an effective transmission distance longer than the preset distance.

2. The electronic device of claim 1, further comprising:
an audio encoder, coupled with the modulation circuit module; and
a microphone, coupled with the audio encoder.

3. The electronic device of claim 1, further comprising:
an audio decoder, coupled with the demodulation circuit module; and
a speaker, coupled with the audio decoder.

4. The electronic device of claim 1, wherein
the modulation circuit module comprises a first digital-signal processing chip, a coordinate rotation digital computer, a differential circuit module, a first digital-to-analog converter, and a second digital-to-analog converter;
the transmitter comprises a first low-pass filter, a second low-pass filter, a phase-locked loop circuit module, and an integrated power amplifier;
the first digital-signal processing chip is coupled with the coordinate rotation digital computer, the coordinate rotation digital computer is coupled with the first digital-to-analog converter and the differential circuit module, the differential circuit module is coupled with the second digital-to-analog converter, the first digital-to-analog converter is coupled with the first low-pass filter, the second digital-to-analog converter is coupled with the second low-pass filter, the second low-pass filter is coupled with the phase-locked loop circuit module, the phase-locked loop circuit module is coupled with the integrated power amplifier, and the integrated power amplifier is coupled with the external power amplifier; and
a polar architecture is adopted for the transmitter to improve efficiency of the external power amplifier and lower the peak-to-average power ratio (PAPR) requirement.

5. The electronic device of claim 1, wherein
the receiver comprises an integrated low-noise filter, a first mixer, a second mixer, a first in-phase and quadrature (IQ) phase modulation module, a first local oscillator, a first image-reject filter, a second image-reject filter, a first variable gain amplifier, and a second variable gain amplifier;
the demodulation circuit module comprises a first analog-to-digital converter, a second analog-to-digital converter, a third mixer, a fourth mixer, a second IQ phase modulation module, a second digital-signal processing chip, and a second local oscillator;
the external low-noise filter is coupled with the integrated low-noise filter, the integrated low-noise filter is coupled with the first mixer and the second mixer, the first mixer and the second mixer are coupled with the first IQ phase modulation module, the first IQ phase modulation module is coupled with the first local oscillator, the first mixer is coupled with the first image-reject filter, the first image-reject filter is coupled with the first variable gain amplifier, the first variable gain amplifier is coupled with the first analog-to-digital converter, the first analog-to-digital converter is coupled with the third mixer, the third mixer is coupled with the second digital-signal processing chip, the second image-reject filter is coupled with the second variable gain amplifier, the second variable gain amplifier is coupled with the second analog-to-digital converter, the second analog-to-digital converter is coupled with the fourth mixer, the fourth mixer is coupled with the second digital-signal processing chip, the third mixer and the fourth mixer are coupled with the second IQ phase modulation module, the second IQ phase modulation module is coupled with the second local oscillator;
the first image-reject filter is coupled with the second image-reject filter, and the first analog-to-digital converter is coupled with the second analog-to-digital converter; and
the first analog-to-digital converter and the second analog-to-digital converter of the receiver adopt Quadrature bandpass sigma-delta analog-to-digital converter (SD-ADC), since center frequency and bandwidth of the SD-ADC are adjustable, the optimal noise transfer function (NTF) is obtained based on bandwidth of a traditional signal and an enhanced signal to suppress quantization noise.

6. The electronic device of claim 1, wherein the received-signal processing circuit further comprises a pre-filter, and the pre-filter is coupled with the antenna and the external low-noise filter.

7. A method for transmitting a message, applicable to an electronic device, the method comprising:
obtaining predetermined information, the predetermined information comprising system time, flow of people in a predetermined area, and location information of the predetermined area;
adjusting a transmission power of a low-power wide-area network (LPWAN) wireless-communication module of the electronic device according to the predetermined information;
wherein the LPWAN wireless-communication module comprises a received-signal processing circuit and a transmitted-signal processing circuit, the received-signal processing circuit and the transmitted-signal processing circuit are connected in parallel;
wherein the received-signal processing circuit comprises a demodulation circuit module, a receiver, and an external low-noise filter, wherein the demodulation circuit module is coupled with the receiver, the receiver is coupled with the external low-noise filter, the external low-noise filter is coupled with the antenna and is operable in the operation mode, the operation mode is configured for implementing an enhanced signal-reception function in the LPWAN, the enhanced signal-reception function has an effective transmission distance longer than the preset distance;
wherein the transmitted-signal processing circuit comprises a modulation circuit module, a transmitter, and an external power amplifier;
wherein an application processor is coupled with the modulation circuit module and the demodulation circuit module, the modulation circuit module is coupled with the transmitter, the transmitter is coupled with the external power amplifier, the external power amplifier is coupled with the antenna and is operable in the operation mode;
determining a message to be transmitted; and
transmitting, by the LPWAN wireless-communication module, the determined message according to the adjusted transmission power.

8. The method of claim 7, wherein the predetermined information is the system time and adjusting the transmission power of the LPWAN wireless-communication module of the electronic device according to the predetermined information comprises:
obtaining a target time period to which the system time belongs;

obtaining a predetermined mapping relationship between time periods and transmission powers;

determining transmission power corresponding to the target time period by querying the mapping relationship; and adjusting the transmission power of the LPWAN wireless-communication module of the electronic device to the transmission power determined.

9. The method of claim 7, wherein the predetermined information is the flow of people in the predetermined area and adjusting the transmission power of the LPWAN wireless-communication module of the electronic device according to the predetermined information comprises:

determining a reference coverage area according to the flow of people in the predetermined area when the flow of people in the predetermined area is less than predetermined flow of people, determining a transmission power according to the reference coverage area, and adjusting the transmission power of the LPWAN wireless-communication module of the electronic device to the transmission power determined;

detecting whether a merchant in the predetermined area has a sales promotion when the flow of people in the predetermined area is larger than the predetermined flow of people;

based on detecting that merchant in the predetermined area has a sales promotion when the flow of people in the predetermined area is larger than the predetermined flow of people, determining a reference coverage area according to the flow of people in the predetermined area and obtaining a target coverage area by correcting the reference coverage area according to the location of the merchant which has the sales promotion; determining a transmission power according to the target coverage area, and adjusting the transmission power of the LPWAN wireless-communication module of the electronic device to the transmission power determined; and based on detecting that the merchant in the predetermined area does not have a sales promotion when the flow of people in the predetermined area is larger than the predetermined flow of people, determining a reference coverage area according to the flow of people in the predetermined area, determining a transmission power according to the reference coverage area, and adjusting the transmission power of the LPWAN wireless-communication module of the electronic device to the transmission power determined.

10. The method of claim 7, wherein the predetermined information is the flow of people in the predetermined area and the location information of the predetermined area, and adjusting the transmission power of the LPWAN wireless-communication module of the electronic device according to the predetermined information comprises:

obtaining a subarea set of the predetermined area, the subarea set comprising a plurality of subareas in the predetermined area, and any two subareas being different from each other;

obtaining flow of people of each of the plurality of subareas;

filtering at least one subarea in which flow of people is greater than a first threshold;

selecting from the at least one subarea a target subarea farthest from the electronic device;

determining a transmission power according to the target subarea; and adjusting the transmission power of the LPWAN wireless-communication module of the electronic device to the transmission power determined.

11. The method of claim 7, wherein determining the message to be transmitted comprises:

obtaining location information of a plurality of user equipments (UEs) within a signal coverage area corresponding to a current transmission power;

dividing the plurality of UEs into at least one equipment set according to the location information and a location area of at least one merchant within the signal coverage area, wherein location information of UEs in each of the at least one equipment set is in a location area of a merchant corresponding to the each device set;

obtaining a message corresponding to each of the at least one merchant; and determining the message to be transmitted to the UEs in the each of the at least one equipment set according to the obtained message corresponding to each of the at least one merchant.

12. The method of claim 7, wherein determining the message to be transmitted comprises:

obtaining user information of each of a plurality of UEs within a signal coverage area corresponding to a current transmission power;

obtaining a plurality of user information sets by categorizing the user information of each of the plurality of UEs according to a predetermined parameter, the predetermined parameter comprising any one of the following: gender, age, occupation, and interest; and determining the message to be transmitted for the plurality of user information sets.

13. The method of claim 7, wherein determining the message to be transmitted comprises:

obtaining a target time period to which the system time belongs;

obtaining a predetermined mapping relationship between time periods and massages;

obtaining a message corresponding to the target time period by querying the mapping relationship; and determining the message obtained as the message to be transmitted.

14. An electronic device, comprising an application processor, a memory, a communication interface, and one or more programs stored in the memory and configured to be executed by the application processor, the one or more programs comprising instructions operable with the processor to:

obtain predetermined information, the predetermined information comprising system time, flow of people in a predetermined area, and location information of the predetermined area;

adjust a transmission power of a low-power wide-area network (LPWAN) wireless-communication module of the electronic device according to the predetermined information;

wherein the LPWAN wireless-communication module comprises a received-signal processing circuit and a transmitted-signal processing circuit, the received-signal processing circuit and the transmitted-signal processing circuit are connected in parallel;

wherein the received-signal processing circuit comprises a demodulation circuit module, a receiver, and an external low-noise filter, wherein the demodulation circuit module is coupled with the receiver, the receiver is coupled with the external low-noise filter, the external low-noise filter is coupled with the antenna and is operable in the operation mode, the operation mode is configured for implementing an enhanced signal-reception function in the LPWAN, the enhanced signal-reception function has an effective transmission distance longer than the preset distance;

wherein the transmitted-signal processing circuit comprises a modulation circuit module, a transmitter, and an external power amplifier;

wherein the application processor is coupled with the modulation circuit module and the demodulation circuit module, the modulation circuit module is coupled with the transmitter, the transmitter is coupled with the external power amplifier, the external power amplifier is coupled with the antenna and is operable in the operation mode;

determine a message to be transmitted; and transmit the determined message according to the adjusted transmission power by the LPWAN wireless-communication module.

15. The electronic device of claim 14, wherein the predetermined information is the system time, and in terms of adjusting the transmission power of the LPWAN wireless-communication module of the electronic device according to the predetermined information, the one or more programs comprises instructions operable with the processor to:

obtain a target time period to which the system time belongs;

obtain a predetermined mapping relationship between time periods and transmission powers;

determine transmission power corresponding to the target time period by querying the mapping relationship; and adjust the transmission power of the LPWAN wireless-communication module of the electronic device to the transmission power determined.

16. The electronic device of claim 14, wherein the predetermined information is the flow of people in the predetermined area and, and in terms of adjusting the transmission power of the LPWAN wireless-communication module of the electronic device according to the predetermined information, the one or more programs comprises instructions operable with the processor to:

determine a reference coverage area according to the flow of people in the predetermined area when the flow of people in the predetermined area is less than predetermined flow of people, determine a transmission power according to the reference coverage area, and adjust the transmission power of the LPWAN wireless-communication module of the electronic device to the transmission power determined;

detect whether a merchant in the predetermined area has a sales promotion when the flow of people in the predetermined area is larger than the predetermined flow of people;

based on detecting that merchant in the predetermined area has a sales promotion when the flow of people in the predetermined area is larger than the predetermined flow of people, determine a reference coverage area according to the flow of people in the predetermined area and obtain a target coverage area by correcting the reference coverage area according to the location of the merchant which has the sales promotion; determine a transmission power according to the target coverage area, and adjust the transmission power of the LPWAN wireless-communication module of the electronic device to the transmission power determined; and based on detecting that merchant in the predetermined area does not have a sales promotion when the flow of people in the predetermined area is larger than the predetermined flow of people, determine a reference coverage area according to the flow of people in the predetermined area, determine a transmission power according to the reference coverage area, and adjust the transmission power of the LPWAN wireless-communication module of the electronic device to the transmission power determined.

17. The electronic device of claim 14, wherein the predetermined information is the flow of people in the predetermined area and the location information of the predetermined area, and in terms of adjusting the transmission power of the LPWAN wireless-communication module of the electronic device according to the predetermined information, the one or more programs comprises instructions operable with the processor to:

obtain a subarea set of the predetermined area, the subarea set comprising a plurality of subareas in the predetermined area, and any two subareas being different from each other;

obtain flow of people of each of the plurality of subareas;

filter at least one subarea in which flow of people is greater than a first threshold;

select from the at least one subarea a target subarea farthest from the electronic device;

determine a transmission power according to the target subarea; and adjust the transmission power of the LPWAN wireless-communication module of the electronic device to the transmission power determined.

18. The electronic device of claim 14, wherein in terms of determining the message to be transmitted, the one or more programs comprises instructions operable with the processor to:

obtain location information of a plurality of user equipments (UEs) within a signal coverage area corresponding to a current transmission power;

divide the plurality of UEs into at least one equipment set according to the location information and a location area of at least one merchant within the signal coverage area, wherein location information of UEs in each of the at least one equipment set is in a location area of a merchant corresponding to the each device set;

obtain a message corresponding to each of the at least one merchant; and determine the message to be transmitted to the UEs in the each of the at least one equipment set according to the obtained message corresponding to each of the at least one merchant.

19. The electronic device of claim 14, wherein in terms of determining the message to be transmitted, the one or more programs comprises instructions operable with the processor to:

obtain user information of each of a plurality of UEs within a signal coverage area corresponding to a current transmission power;

obtain a plurality of user information sets by categorizing the user information of each of the plurality of UEs according to a predetermined parameter, the predetermined parameter comprising any one of the following: gender, age, occupation, and interest; and determine the message to be transmitted for the plurality of user information sets.

20. The electronic device of claim 14, wherein in terms of determining the message to be transmitted, the one or more programs comprises instructions operable with the processor to:
  obtain a target time period to which the system time belongs;
  obtain a predetermined mapping relationship between time periods and massages;
  obtain a message corresponding to the target time period by querying the mapping relationship; and
  determine the message obtained as the message to be transmitted.

* * * * *